Patented Mar. 27, 1951

2,546,624

UNITED STATES PATENT OFFICE 2,546,624

PERMEABLE MATERIALS AND METHODS OF MAKING SAME

Robert S. Adams, Duncan, Okla., assignor to Halliburton Oil Well Cementing Company, Duncan, Okla.

No Drawing. Application April 4, 1946, Serial No. 659,655

6 Claims. (Cl. 260—2.5)

This invention relates to methods and materials for making permeable bodies and more particularly to the making of a permeable body or plug of synthetic resin adapted to be formed in situ in an oil well or the like.

Ordinarily, synthetic resins made by the condensation of phenol and formaldehyde are hard and dense and may be said to be practically impermeable to fluids such as oil or water. There is a need, however, for a porous and permeable material. For example, if a permeable resinous body can be formed in situ in an oil well, it can be used as a filter to prevent loose sand or other solid matter from invading the bore hole. Various screens, filters, and gravel packs have heretofore been used in oil wells for this purpose, but the expedients used heretofore have not completely solved the problem of preventing earth formations from sloughing off into the well. Also, because their permeability cannot always be controlled to approximate that of the formation, gravel packs and screens in oil wells commonly permit migration of solids and thus become plugged so that they have to be removed and replaced.

In accordance with the present invention, it is proposed to provide material suitable for setting up into a solid mass in a bore hole but in which the permeability of the mass may be controlled and caused to vary as desired from 400 millidarcys up to as high as 80,000 millidarcys.

It is a further object of the invention to provide a solid, molded body of synthetic resinous material which may be used as a filter for fluids and in which the permeability can be controlled or adjusted during molding operations.

It is still another object of the invention to provide a molded body of synthetic resinous material which can be used as a filter and which can be made at temperatures ranging from 80° Fahrenheit to 180° Fahrenheit and under pressures up to as high as 3,000 pounds per square inch. The temperature and pressure conditions given are by no means to be considered as the limits, but tests already conducted indicate that the invention is feasible within that range and that the degree of permeability of the material when set can be fairly accurately controlled or regulated within that range.

It is still another object of the invention to provide a novel method of making a permeable body of synthetic resinous material.

It is still another object of the invention to provide a novel method for forming a filter in the bore hole of an oil well or the like.

Other objects and advantages reside in certain novel features of the materials used and the steps employed in forming a permeable body as will be more apparent from the following description.

While those skilled in the art will at once recognize many applications of the present invention to other arts where permeable bodies or filters are employed, it will be described here in detail in connection with its application for the forming of a permeable plug or filter in an oil well.

In many oil fields throughout the country, particles of sand or other solid matter flow or fall into the bore hole as the oil is produced. These offending particles cause rapid wear on the pump mechanism and repeatedly require clean-out jobs. Gravel packs and screens of various kinds have been useful in overcoming the difficulties caused by the presence of the sand, but these expedients have not completely solved the problem. For many years, the desirability of forming a permeable plug in situ in an oil well has been recognized and various materials have been proposed for forming such a filter. See, for instance, the patents to Vollmer, No. 2,288,556, granted June 30, 1942, for "Method of and Composition for Producing Permeable Packs in Wells," and No. 2,288,557, granted June 30, 1942, for "Method of and Composition for Producing Permeable Cement Packs in Wells."

The present invention relates to the use of synthetic resins for the formation of a monolithic permeable pack or filter in a well adjacent the producing earth formation. It has been discovered that certain phenol-formaldehyde resins may be caused to set into a permeable mass if the resins are properly treated while they are still in a liquid phase. There are on the market certain phenol-formaldehyde thermo-setting resins which can be used to carry out the present invention. One resin which has been found to be suitable for the purposes of the present invention is a phenolic thermosetting resin having the following properties: (1) a viscosity of 30 to 40 seconds as measured on the Gardner-Holt tube. (2) A density of 10.15 to 10.35 pounds per gallon (or specific gravity of 1.22 to 1.24). (3) A water miscibility of not more than 15 per cent. (4) Per cent solids of 74% to 80% as determined by A. S. T. M. D–115–41 test method. The suitable phenol-formaldehyde resins are only slightly soluble in water, but they are partially condensed while still in their liquid phase and remain in a liquid phase at ordinary temperatures for a considerable period of time. The condensation may be accelerated by mixing di-ethyl-sulfate, or some other appropriate catalyst with them.

In accordance with the present invention, a permeable resinous body may be formed as follows:

(1) Add to clean water, 8 per cent (by weight of the water) of finely ground or pulverized bentonitic clay. Allow the bentonitic clay to hydrate. Mixing will accelerate hydration, but allow the clay to remain in the water at least forty-eight hours if it is not stirred or mixed.

(2) Add barium sulfate to the 8 per cent bentonitic clay slurry to obtain a mud weighing between ten and ten and one-half pounds per gallon. This is approximately the density of the resins mentioned above, and it is important that the mud have nearly the same density as the resin.

(3) Take a quantity of liquid resin, for example, that meeting the specification given above, and add about 15 per cent, by weight, of water to it. The amount of water may be varied to control the permeability of the resinous body when set. The more water added, the more permeable the body will be.

(4) Add 10 per cent of di-ethyl-sulfate (by weight of the resin) to the mixture of water and resin, and mix thoroughly. The di-ethyl-sulfate serves as an accelerator for the resin, as indicated above.

(5) To the accelerated resin mixture, add about 50 per cent (by weight of the resin mixture) of the prepared mud made as indicated in steps (1) and (2). Mix the mud and the resinous mixture thoroughly. The percentage of mud may be varied, and this also will vary the permeability of the material when set. Likewise, it has been found that the type of mixer used and the length of time the mixing process is carried on, as well as the speed of mixing, varies the permeability of the set product. It should be emphasized, however, that unless the resin and mud slurry are intimately mixed, the set product will not have the desired permeability. The particles of mud must be uniformly suspended.

(6) Place the liquid slurry, made as indicated in step (5), in the place where it is desired to have it set up. If placed in an oil well to form a filter therein, it is imperative that the well bore be clean. It has been found that hot Diesel fuel is an effective agent for cleaning up sludges and paraffins in oil wells. The use of such materials will also condition the face of the earth formation by washing down any loose sand. The hole should be calipered and the correct volume calculated to get the desired volume of plug to be formed. It is desirable to hold the slurry in place in the well by maintaining a hydrostatic head upon it slightly in excess of the formation pressure in the earth. Experience has shown that there will be no separation of the ingredients of the slurry, such as filtering of the liquid resin out of the slurry into the permeable earth formations, even though some differential pressure exists across the slurry during the time that it is setting.

In developing the specifications for the use of the present invention in forming permeable plugs in oil wells, tests were conducted using 30 per cent, 50 per cent, and 70 per cent of the following muds: (1) 6 per cent bentonitic clay in water, to form a mud weighing 9 pounds per gallon, 10 pounds per gallon, and 11 pounds per gallon; (2) 7 per cent bentonitic clay in water, forming a mud weighing 9 pounds per gallon, 10 pounds per gallon, and 11 pounds; (3) 8 per cent bentonitic clay in water, to form a mud weighing 9 pounds per gallon; 10 pounds per gallon, and 11 pounds per gallon.

In the preparation of all these muds, the percentage of bentonite was by weight of water. The bentonite and water were mixed for four to six hours to hydrate the bentonite. Barium sulfate was then added to the slurry to give the desired weight of mud. Each of these muds was then mixed with a resin having the specification given above, accelerated with di-ethyl-sulfate, or other suitable accelerator, as indicated above. In these experiments, it was found that the 8 per cent bentonite slurry, weighted to have a density of 10 to 10.5 pounds per gallon, was the only mud that would consistently give duplicate results. This percentage of bentonite at that particular weight functioned each time to cause a formation of a permeable plug. It was found that the best percentage of mud to use with the resin was 50 per cent by weight of the resin used. The permeabilities with this percentage of mud mixed with the resin vary from 1,000 up to 30,000 millidarcys, with the average being 4,000 to 6,000 millidarcys, the permeability depending upon the nature of the mixing operations and the amount of water used with the resin under step (3) of the process indicated above. It was found that by using less than 50 per cent of mud, the pores of the set material were larger and not as uniform as with 50 per cent or more of mud. When 70 per cent mud was used, the set product had finer pores and a lower permeability, but with this amount of mud present the resin was at a critical stage and did not appear to set up satisfactorily. Thus, the permeability of the set product can be controlled to some degree by varying the percentage of mud.

It is essential that the mud and resin be thoroughly dispersed if a satisfactory permeable plug is to be secured. The mixer should create sufficient agitation to produce complete dispersion. Also, it appears to be necessary to mix the materials just prior to their use. An experimental run in which mud was mixed with the resin and allowed to remain in cold storage for twenty-four hours before adding the accelerator, resulted in the formation of a plug which was not satisfactory as to permeability.

The material mixed in accordance with the invention sets up in oil or salt or fresh water. It is not affected by contamination of either.

As the material, mixed in accordance with the invention, sets up, there appears to be little or no chemical reaction. As it sets, however, minute holes or pores form throughout. After the material is set, examination under the microscope shows it to be completely pock-marked.

In setting the material in an oil well or the like, the most desirable condition would be where the fluid pressure was static, provided there was no tendency for the slurry to move up the hole during setting. This is desirable to avoid agitation or channeling of the slurry while it is setting up. Excessive differential pressures across the slurry (more than enough to hold the slurry in place) should be avoided, as it might cause the resin in the slurry to filter out into the formation. Should this condition exist, the resin would set up into an impermeable solid.

The permeability can be controlled so as to approximate that of the oil producing earth formation. This tends to minimize the difficulties caused by sand or bituminous products forming in the filter and clogging the same, such as commonly occur in gravel packs and on the outside of metallic screens.

It should be noted further that the present invention is not directed to any treatment of the earth formations themselves. The material which constitutes the filter remains in the bore hole so that if it becomes plugged it can readily be drilled out and replaced.

While only a few embodiments of the invention have been described in detail herein, it will be apparent to those skilled in the art that various changes can be made without departing from the spirit of the invention or the scope of the annexed claims.

I claim:

1. A composition of matter for use in making a filter suitable for use in an oil well comprising a slurry consisting essentially of intimately mixed portions of clay mud and liquid synthetic resin, the mud and liquid resin having approximately the same density and the liquid resin being thermosetting phenol-formaldehyde having some water miscibility but not over 15 percent miscibility.

2. The composition of matter defined in claim 1 in which the clay mud is bentonitic in character and in which the portions of mud and liquid resin are approximately two parts resin and one part mud.

3. The composition of matter defined in claim 1 in which the clay mud is formed by mixing approximately 92 percent water and 8 percent bentonite by weight to which sufficient weighting material is added to obtain a mud having a density of from 10 to 10.5 pounds per gallon and in which the liquid resin has a viscosity of 30 to 40 as measured on a Gardner-Holt tube, a density of 10.15 to 10.35 pounds per gallon and 74 to 80 percent solids as determined by the A. S. T. M. D-115-41 test method.

4. The method of making a permeable filter consisting of a condensation product of thermosetting phenol-formaldehyde resin which includes the steps of intimately mixing with said resin while in liquid form a clay mud having approximately the same density as that of the liquid resin and the liquid resin having some water miscibility but not over 15 percent miscibility and allowing the resin to set while so mixed.

5. The method defined in claim 4 in which the clay mud used is bentonitic in character and in which the proportions of mud and resin are approximately two parts resin and one part mud.

6. The method defined in claim 4 in which the clay mud used is formed by mixing approximately 92 percent water and 8 percent bentonite by weight, to which sufficient weighting material is added to obtain a mud having a density of from 10 to 10.5 pounds per gallon and in which the liquid resin used has a viscosity of 30 to 40 as measured on a Gardner-Holt tube, a density of 10.15 to 10.35 pounds per gallon and 74 to 80 percent solids as determined by the A. S. T. M. D-115-41 test method.

ROBERT S. ADAMS.

REFERENCES CITED

The following references are of record in the file of this patent:

UNITED STATES PATENTS

| Number | Name | Date |
| --- | --- | --- |
| 1,092,512 | Aylsworth | Apr. 7, 1914 |
| 1,576,440 | Martin | Mar. 9, 1926 |
| 2,089,813 | Rice | Aug. 10, 1937 |
| 2,155,016 | Kershaw | Apr. 18, 1939 |
| 2,189,889 | Engel | Feb. 13, 1940 |
| 2,240,622 | Lawson | May 6, 1941 |
| 2,285,302 | Patterson | June 2, 1942 |
| 2,288,556 | Vollmer | June 30, 1942 |
| 2,288,557 | Vollmer | June 30, 1942 |